E. A. GUTERMANN.
PERCOLATOR POT AND STAND.
APPLICATION FILED APR. 18, 1910.

985,997.

Patented Mar. 7, 1911.
3 SHEETS—SHEET 2.

Witnesses:
Fred H. W. Dannenfelser
Chas. M. Peard

Inventor
E. A. Gutermann
By his Attorneys

E. A. GUTERMANN.
PERCOLATOR POT AND STAND.
APPLICATION FILED APR. 18, 1910.
985,997.
Patented Mar. 7, 1911.
3 SHEETS—SHEET 3.
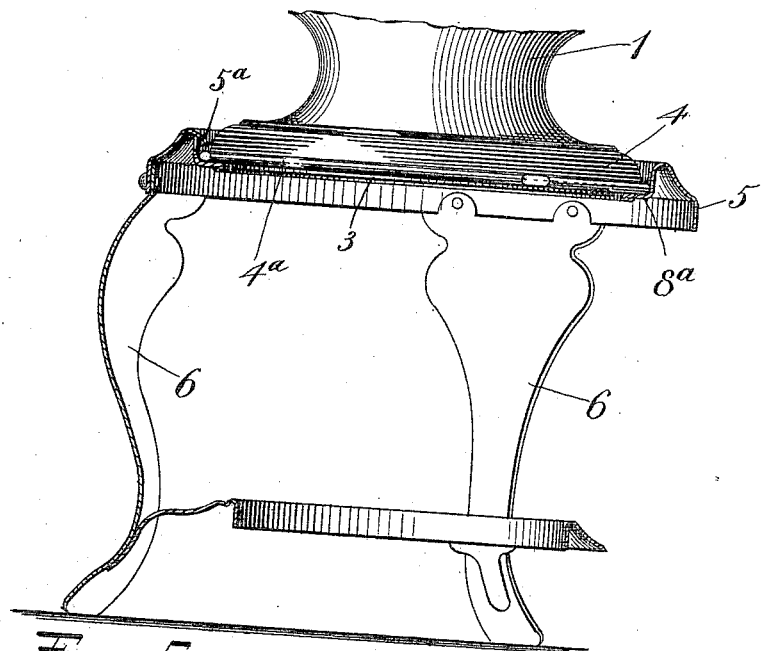
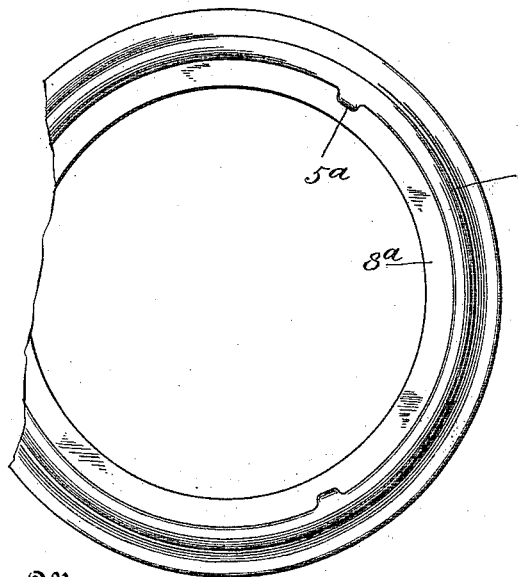
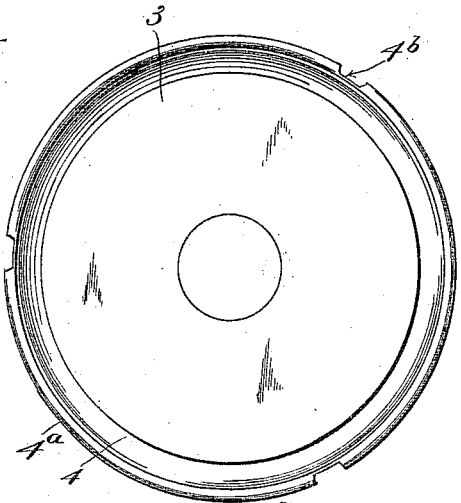
Witnesses:
Fred K. M. Dannenfelser
Chas. N. Pearl
Inventor
E. A. Gutermann
By his Attorneys

UNITED STATES PATENT OFFICE.

EDWARD A. GUTERMANN, OF MERIDEN, CONNECTICUT, ASSIGNOR TO MANNING, BOWMAN & COMPANY, OF MERIDEN, CONNECTICUT, A CORPORATION OF CONNECTICUT.

PERCOLATOR-POT AND STAND.

985,997.

Specification of Letters Patent. Patented Mar. 7, 1911.

Application filed April 18, 1910. Serial No. 556,113.

*To all whom it may concern:*

Be it known that I, EDWARD A. GUTERMANN, a citizen of the United States, residing at Meriden, county of New Haven, Connecticut, have invented certain new and useful Improvements in Percolator-Pots and Stands, of which the following is a full, clear, and exact description.

My invention relates to improvements in stands for coffee urns and the like, and is particularly concerned with a device of this character which is especially adapted for use with percolator coffee pots, which are provided with a heating chamber appended to the bottom of the pot and formed of solid metal having a wide laterally extending heating disk preferably integral therewith, whereby the heat imparted to the disk is conducted directly to the heating chamber.

The object of the invention is to so support the urn or pot that this heating disk will contact with the plate ring of the stand at the fewest points or not at all in order that the heat of the disk will not be dissipated into the stand.

With this object in view the invention contemplates a construction on the one hand in which the plate ring is provided with raised supports upon which the perimeter of the disk rests, but which holds the disk free of the plate ring as a whole, or, on the other hand, a construction in which the base rim of the pot only, rests upon the plate ring with the heating disk held entirely free thereof.

A further object of the invention is to provide means in both of these constructions for locking the urn and stand together, to prevent accidental disengagement of the parts.

Figure 1:
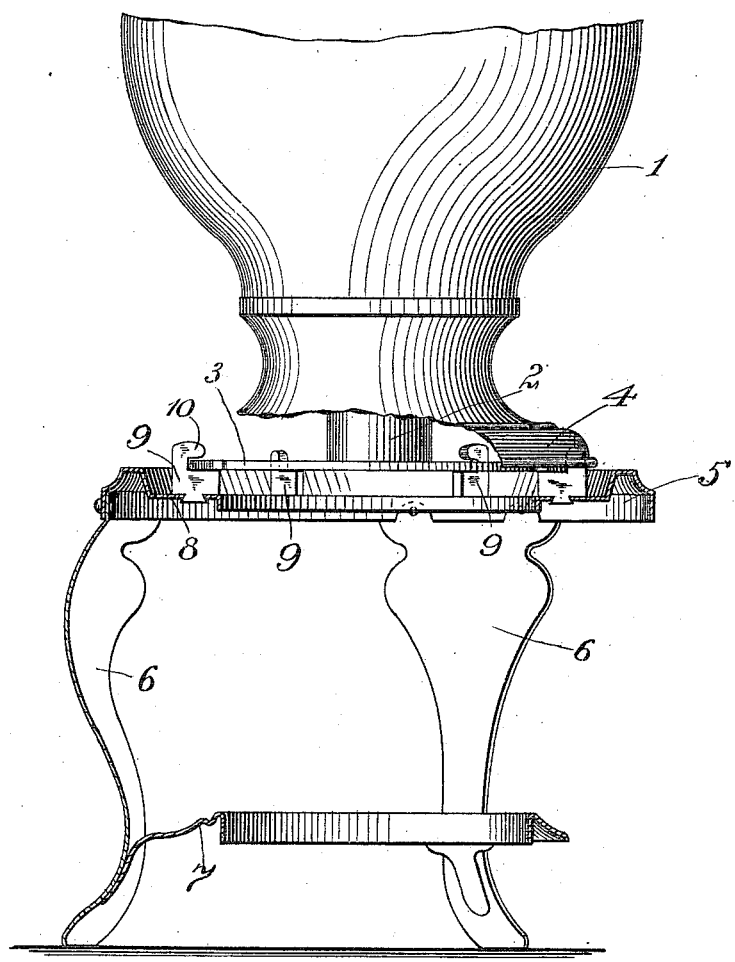
Figure 2:
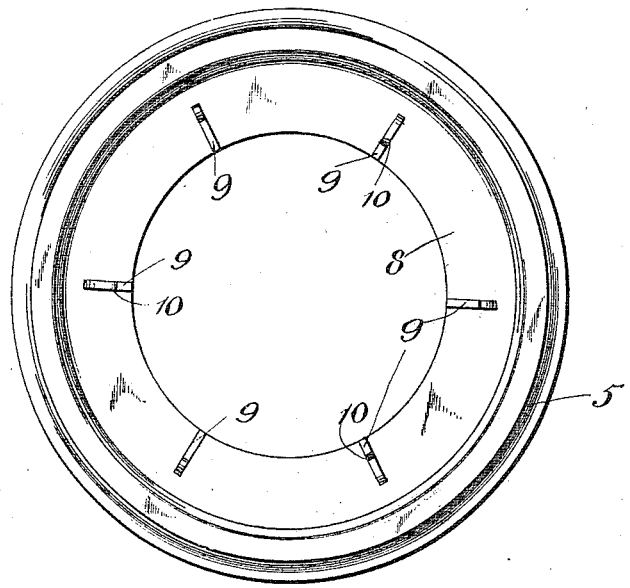
Figure 3:
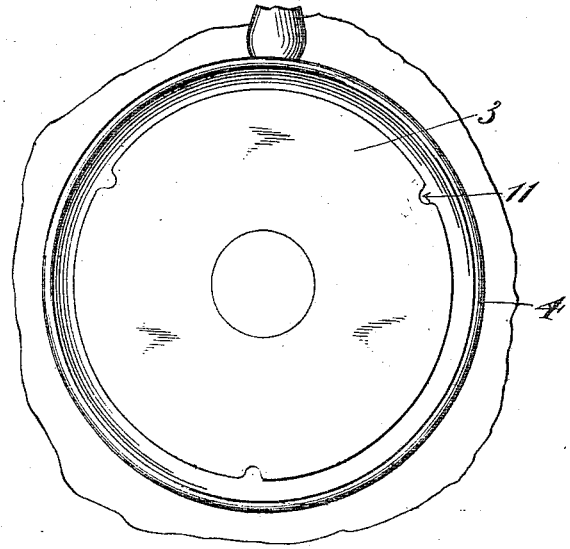

With these objects in view the invention consists in the construction and arrangement of parts, preferred forms of which are illustrated in the accompanying drawings, in which, Figure 1 is an elevation partly in section of a stand and urn embodying one form of my improvement. Fig. 2 is a plan view of the plate ring of the stand shown in Fig. 1; Fig. 3 is an under side plan view of the urn showing the heating disk depending within the perimeter of the base rim; Fig. 4 is a view similar to Fig. 1 showing a modified form of construction in which the base rim of the urn rests directly upon the plate ring of the stand; Fig. 5 is a fragmentary view in plan of the plate ring shown in Fig. 4, and Fig. 6 is a bottom plan view of the urn shown in Fig. 4.

In the embodiment of my invention illustrated in Figs. 1 to 3 inclusive, 1 indicates a coffee urn of the percolator type, having a heating chamber 2 appended to the bottom thereof, said chamber having formed therewith or attached thereto a heating disk 3, by which the heat imparted from the lamp or source of heat is conducted directly to the heating chamber. The urn is provided with a base rim 4, said rim and disk being so arranged that the latter projects slightly below the plane of the bottom of the lamp, so that, if desired, the urn may be placed upon an ordinary stove with the heating disk in direct contact therewith. In the construction here illustrated, however, the urn is shown in conjunction with a stand adapted to be placed upon a table, said stand having means to hold a lamp for heating purposes. The stand comprises a plate ring 5 supported by standards 6 between which is mounted a suitable bracket 7 for supporting the lamp. The plate ring is provided with an inwardly extended flange 8 to which is secured a plurality of rests or supports 9. Some of these supports, preferably alternate ones, are provided with hook members 10 adapted to engage the perimeter of the heating disk to hold the urn and stand together. As shown in Fig. 3, the heating disk is provided with notches 11, which may be brought to register with the hook shaped rest supports 9, whereupon a slight turn of the urn or stand will serve to lock the parts together. By this construction contact between the plate ring and the disk is reduced to a minimum, and consequently very little heat is dissipated from the disk to the stand.

In the embodiment of the invention illustrated in Fig. 4, the flange $8^a$ of the plate ring 5 is of less width than that illustrated in the form heretofore described, so that, when the base rim 4 rests upon this flange, the heating disk 3 is held entirely free thereof and projects slightly below it. In order to lock the urn and stand together, the base rim 4 of the urn is provided with a beading $4^a$, in which are formed notches $4^b$ at intervals adapted to register with inwardly extending lugs $5^a$ (Fig. 5) on the plate ring when the urn is placed upon the stand, whereupon a slight turn of either of these parts will serve to lock them together. In this construction it will be seen that the heating disk 3 projects into the opening of the plate ring flange 8ª, but is held entirely free thereof by the seating of the base rim of the pot in the plate ring so that very little of the heat of the disk is dissipated to the stand.

While I have herein described a particular embodiment of my invention, it is to be understood that the same may be varied in detail and relative arrangement of parts within the scope of the appended claims.

What I claim is:

1. In a device of the character described, the combination with a stand having a plate ring provided with a supporting flange, of a fluid containing vessel having a heating chamber depending from the bottom thereof, said chamber having a heating disk extending laterally from the bottom thereof, means on said flange forming rests for receiving and supporting said disk free of said flange, and means for locking said disk and stand together.

2. In a device of the character described, the combination with a stand having a plate ring, of a fluid containing vessel having a depending heating chamber provided with a laterally extending heating disk, rests projecting from said ring adapted to support said disk free of the ring, some of said rests having means for locking said disk and stand together.

3. In a device of the character described, the combination with a stand having a plate ring, of a fluid containing vessel having a heating chamber depending from the bottom thereof and provided with a laterally extending heating disk, rests extending from said ring and adapted to support said disk free of said ring, some of said rests having hook-shaped extensions and said disk being notched at its perimeter to receive said extensions whereby said vessel and stand may be locked together.

EDWARD A. GUTERMANN.

Witnesses:
GEORGE E. SAVAGE,
JOHN A. STERNBERG.

Copies of this patent may be obtained for five cents each, by addressing the "Commissioner of Patents, Washington, D. C."